United States Patent Office 3,061,450
Patented Oct. 30, 1962

3,061,450
METHOD OF PRODUCING A BINDER
Hinrich Reimers, Neustadt an der Weinstrasse, Germany, assignor to Rofusa N.V., Willemstad, Curacao, Netherlands Antilles, a corporation of the Netherlands Antilles
No Drawing. Filed Sept. 26, 1958, Ser. No. 763,457
4 Claims. (Cl. 106—109)

It is known to employ the anhydrite accruing in the production of hydrofluoric acid from fluorspar as raw material for building materials. When working up this material it is necessary to add activators or excitants to attain setting times which can be reasonably allowed in practice. As a rule either lime or cement in excess (up to 3%) after neutralization, or sulphates, or a mixture of lime or cement and sulphates are generally added as excitants so as to shorten the setting period as far as possible.

An objection to these activators is that in many cases the setting process still takes too long with the result that, for example when producing building elements, plates and bricks from synthetic anhydrite, the mass must remain for very long periods in the molds, making the process of production more expensive. When producing building elements by pressing and the like, the products, on account of their weak initial strength, are very delicate to handle and transport and therefore result in a great deal of waste. Many of these admixtures, such as sodium sulphate, for example, flour on drying out, while iron salts cause undesirable discolorations in the final product.

Attempts have also been made to accelerate the period of setting in the case of products made from synthetic anhydrite by working with very high pressures and by shaking. These measures permit the quantity of mixing water to be reduced by 1 to 2% but the setting time for the wall elements, slabs or stair steps and the like produced thereby is scarcely influenced.

It has now been unexpectedly found that a considerable shortening of the setting period can be attained if small quantities of alkali sulphides are added to the anhydrite which is neutralized, preferably with lime. The alkali sulphide can be added to the mixing water, but it is better if it is introduced during the grinding step in the production of a binder ready for use.

A suitable and cheap alkali sulphide is the product known by the name of liver of sulphur (hepar sulfuris), the commercial quality products being preferably chosen on account of their low price. The impurities present in the commercial quality liver of sulphur, such as sodium sulphate, barium sulphate, do not interfere with the shortened setting process.

The added alkali sulphides weather after setting and do not dry out and show no discoloration effect. The quantity to be added is the range of approximately 0.3 to 3%; the best effect being obtained with an addition of 0.5% based on the weight of the dry anhydrite.

At the same time it has been found that the increase in strength is almost proportional to the shortening of the setting times.

EXAMPLE

The water requirement for an anhydrite neutralized hot with lime (CaO) was fixed according to the stipulations of standard stiffness and the German Standard 1164 § 24b applicable for testing the setting times. The accompanying Table I indicates the commencement of the setting period for mixes containing liver of sulphur, in accordance with the present invention, and containing other previously employed activators or accelerators.

The accompanying Table II indicates the ultimate stress values attained under the same conditions.

From Tables I and II it is apparent that the addition of liver of sulphur in comparative tests led to a considerable shortening of the setting time and a considerable increase in the strengths attained so that the process of manufacture can be greatly accelerated.

Table I

Commencement of the setting period in minutes (1) Anhydrite+23% water without addition _____ 155
(2) Anhydrite+26% water with addition of 2% CaO__ 110
(3) Anhydrite+26% water with addition of 0.5% $K_2SO_4$ _____ 62
(4) Anhydrite+24% water with addition of 0.5% $NaHSO_3$ _____ 93
(5) Anhydrite+24% water with addition of 0.5% $Na_2SO_4$ _____ 47
(6) Anhydrite+24% water with addition of 0.5% liver of sulphur_____ 12

Table II

| | Strength test after— | | | | | |
|---|---|---|---|---|---|---|
| | 3 days | | 7 days | | 28 days | |
| | B | D | B | D | B | D |
| (1) Anhydrite without addition | 18 | 94 | 47 | 223 | 56 | 273 |
| (2) Anhydrite with 2% CaO | 29 | 143 | 52 | 261 | 61 | 304 |
| (3) Anhydrite with 0.5% $K_2SO_4$ | 47 | 254 | 68 | 346 | 78 | 397 |
| (4) Anhydrite with 0.5% $NaHSO_3$ | 38 | 191 | 59 | 295 | 70.5 | 351 |
| (5) Anhydrite with 0.5% $Na_2SO_4$ | 52 | 260 | 72 | 362 | 83 | 415 |
| (6) Anhydrite with 0.5% liver of sulphur | 68 | 327 | 104 | 469 | 112 | 483 |

NOTE.—B=Bending strength, kg./cm.$^2$  D=Compression strength kg./cm.$^2$

I claim:
1. A process for the production of a moldable and settable gypsum plaster composition having accelerated hardening and increased solidity from synthetic anhydrite produced as a by-product in the production of hydrofluoric acid from fluor spar which consists in adding to the anhydrite a sulfide selected from the group consisting of sodium sulfide, liver of sulfur and potassium sulfide in the amount of 0.3 to 3% based on the weight of the dry anhydrite, mixing the resulting material with water and recrystallizing the anhydrite.

2. A process for the production of a moldable and settable gypsum plaster composition having accelerated hardening and increased solidity from synthetic anhydrite produced as a by-product in the production of hydrofluoric acid from fluor spar, which consists in adding to the anhydrite a technical potassium sulfide known as liver of sulfur in the amount of 0.3 to 3% based on the weight of the dry anhydrite, mixing the resulting material with water and recrystallizing the anhydrite.

3. A process for the production of a moldable and settable gypsum plaster composition having accelerated hardening and increased solidity from synthetic anhydrite produced as a by-product in the production of hydrofluoric acid from fluor spar, which consists in adding to the anhydrite a sulfide selected from the group consisting of sodium sufide, liver of sulfur and potassium sulfide in the amount of 0.5 to 1% based on the weight of the dry anhydrite, mixing the resulting material with water and recrystallizing the anhydrite.

4. A process for the production of a moldable and settable gypsum plaster composition having accelerated hardening and increased solidity from synthetic anhydrite produced as a by-product in the production of hydrofluoric acid from fluor spar, which consists in adding to the anhydrite a technical potassium sulfide known as liver of sulfur in the amount of 0.5 to 1% based on the weight of the dry anhydrite, mixing the resulting material with water and recrystallizing the anhydrite.

References Cited in the file of this patent

UNITED STATES PATENTS

| | | |
|---|---|---|
| 1,442,406 | Hennicke | Jan. 16, 1923 |
| 1,879,877 | Lefebure | Sept. 27, 1932 |
| 2,410,390 | Paley | Oct. 29, 1946 |
| 2,606,127 | Weber | Aug. 5, 1952 |
| 2,606,129 | Weber | Aug. 5, 1952 |
| 2,608,491 | Weber | Aug. 26, 1952 |
| 2,662,024 | Riddell | Dec. 8, 1953 |
| 2,937,926 | Hanusch | May 24, 1960 |

FOREIGN PATENTS

| | | |
|---|---|---|
| 298,943 | Great Britain | Feb. 28, 1929 |

OTHER REFERENCES

Hackh's Chemical Dictionary, 2nd ed., Blakiston's Philadelphia, 1937, page 549.